United States Patent

[11] 3,628,639

[72] Inventor Frank R. L. Daley, Jr.
Dayton, Ohio
[21] Appl. No. 664,673
[22] Filed Aug. 31, 1967
[45] Patented Dec. 21, 1971
[73] Assignee General Motors Corporation
Detroit, Mich.

[54] DISC BRAKE CALIPER-MOUNTING MEANS
4 Claims, 3 Drawing Figs.
[52] U.S. Cl..................................................... 188/73.3,
188/71.8, 188/196 P
[51] Int. Cl..................................................... F16d 55/224
[50] Field of Search.......................................... 188/73, 73
CL, 73 C, 196 P, 205.3, 71.8, 73.3, 73.5

[56] References Cited
UNITED STATES PATENTS
3,377,076  4/1968  Burnett .......................... 188/73 C UX
2,938,609  5/1960  Burnett .......................... 188/73
3,199,635  8/1965  Bessler et al..................... 188/73
3,358,793  12/1967  Hollnagel et al................. 188/73
3,375,906  4/1968  Hayes.............................. 188/73

FOREIGN PATENTS
1,043,331  9/1966  Great Britain.................... 188/196 P

Primary Examiner—George E. A. Halvosa
Attorneys—W. E. Finken and D. D. McGraw

ABSTRACT: A disc brake assembly having a caliper mounting and guide arrangement in which the caliper moves axially of the disc when the brake is actuated so as to bring brake shoes contained within the caliper into frictional engagement with both sides of the disc. The caliper is mounted and guided on pin or bolt assemblies connected to a support bracket so that the caliper is slidable in axial directions relative to the disc and is resiliently cushioned against rattles. The support bracket takes torque reaction directly from the caliper. Once the caliper is installed as a part of a complete disc brake assembly and the vehicle wheel is in place, the caliper is effectively caged by the disc, the wheel, and the support bracket.

PATENTED DEC 21 1971

3,628,639

INVENTOR.
Frank R. L. Daley, Jr.
BY
D. D. McGraw
ATTORNEY

DISC BRAKE CALIPER-MOUNTING MEANS

The invention relates to a mounting arrangement embodied in an assembly having an axially movable element mounted on an axially fixed element, and more particularly to a disc brake assembly and the mounting and guiding arrangement for a disc brake assembly caliper. In the preferred embodiment the caliper is substantially C-shaped, fits about a peripheral portion of the brake disc and is moved axially of the disc to engage opposed brake shoes with opposite sides of the disc for braking action. Torque reaction is taken through a support bracket rather than through the guide structure. One of the basic forms of disc brake assemblies is that of an axially fixed disc and a movable caliper, with actuating means such as one or more hydraulic cylinders on one side of the caliper. Some arrangement is required to mount the caliper on a nonrotatable part of the mechanism to which the brake assembly is attached. It has been previously proposed to use various types of sliding or pivoting mounts, usually arranged with common bushings sliding or pivoting on guide means. However, when the brake assembly is installed on a motor vehicle and is subject to various corrosive elements, dirt, etc., such mounts have been found to corrode, bind, and cause brake pedal loss. The heavy forces exerted through the bushings when they have to also transmit brake torque reaction also act adversely on the bushing life. Cornering deflection of the brake assembly in this type of mounting usually generates additional pedal loss. The brake mounting which is the subject of the invention has been found to effectively eliminate problems due to corrosion and consequent binding and to minimize pedal loss because of such conditions.

The disc brake assembly embodying the invention essentially includes a mounting bracket through which central portions of bolts are threaded with the caliper having guide flanges positioned over and receiving opposite ends of the bolts, the openings in the guide flanges receiving the bolts being considerably larger than the bolts themselves. Internal grooves are formed in the flange opening inner wall surfaces in which resilient rings, such as rubberlike O-rings, are compressively received. These rings engage the housing and the bolts so that there is no metal-to-metal contact between those members. As the housing moves axially on the bolts the rings slip to permit adjustment of position of the housing required by brake shoe wear. Therefore pedal travel loss is minimized since the caliper and brake shoe assemblies need to be moved very little by fluid displacement before the brakes are again engaged. The bolt assemblies are so constructed as to provide a tension section of substantial length so that the bolts maintain their torque values even though being subjected to severe vibrations and acceleration forces. The compression between the bolt head and the threaded portion of each bolt assembly is taken up by a cylindrical sleeve surrounding the elastic tension portion of the bolt, and the sleeve outer surface acts as one of the bolt areas engaged by a resilient ring. The end of the bolt opposite the head provides a mounting area for engagement by a resilient ring in another caliper flange.

Figure 2:
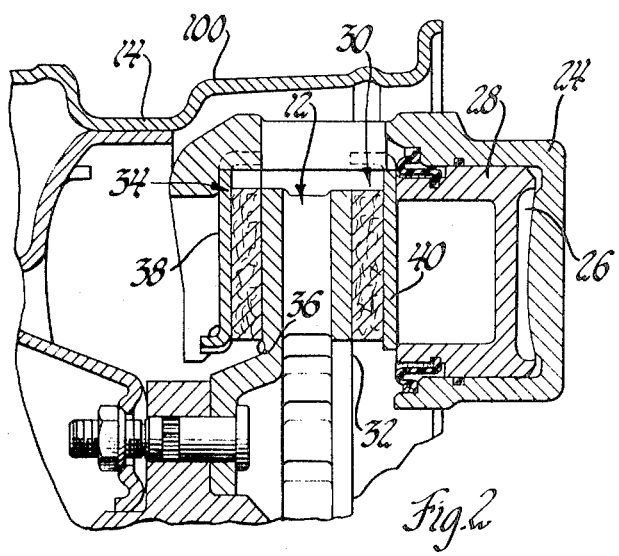
FIG. 2 is a cross section view of the brake assembly of FIG. 1 taken in the direction of arrows 2—2 of that figure, and including the relationship of the caliper to the vehicle wheel being braked.

The disc brake assembly 10 includes a disc 12 attached to the rotatable wheel assembly 14, a caliper-mounting bracket and torque reaction member 16, bolt assemblies 18 and 20 and caliper assembly 22. The caliper assembly includes a housing 24, which is generally C-shaped as seen in FIG. 2 so that it fits over a circumferential portion of the disc 12 and extends radially inward on opposite sides of the disc. The caliper housing has a pressure chamber 26 formed in one side, with a piston 28 received therein. A brake shoe assembly 30 is mounted in the caliper housing and engageable by position 28 so that pressurization of brake fluid in chamber 26 moves the shoe assembly 30 into engagement with the side friction surface 32 of the disc 12. Another brake shoe assembly 34 is received within the housing 24 and, when the housing is moved axially of the disc by reaction of pressure in chamber 26, the shoe assembly 34 is brought into braking engagement with the side friction surface 36 of the disc 12. The shoe assemblies 30 and 34 preferably have their backing plates 38 and 40 so constructed that they engage the tie beam sections 42 and 44 of the caliper housing in such a manner that the shoes act as trailing shoes when braking. They therefore transmit braking torque reaction to the caliper housing through the time beam 42 when the disc is rotating in the direction of arrow 46, and to the tie beam 44 when the disc is rotating in the opposite direction. The bracket 16 has torque-receiving flanges 48 and 50, with flange 48 being aligned to engage tie beam 42 when the shoe assemblies are transmitting torque reaction to tie beam 44, and the flange 50 being aligned to receive torque reaction from tie beam 44 when the shoe assemblies transmit torque reaction to tie beam 42. The edges 52 and 54 of the flanges 48 and 50 are located centrally of the housing and substantially over the peripheral portion of the disc so as to minimize the generation of coupling forces which would tend to twist the caliper housing about an axis generally corresponding to a disc diameter.

Figure 1:
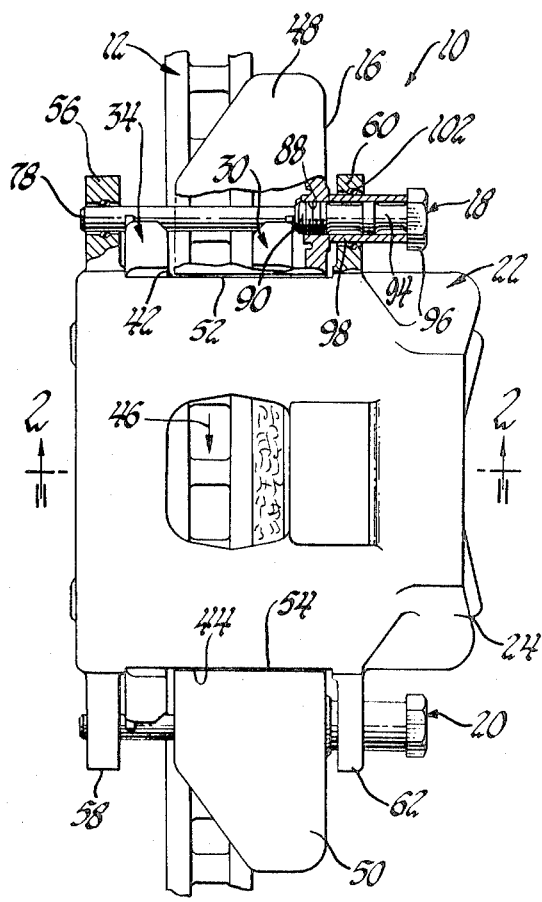
FIG. 1 is a plan view of a disc brake assembly embodying the invention, with parts broken away and in section.
Figure 3:
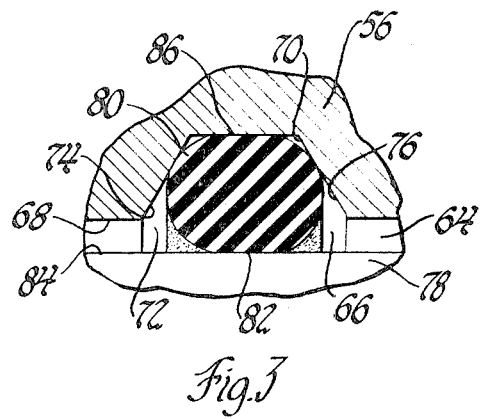
FIG. 3 is an enlarged fragmentary section view of a resilient ring in one of the caliper flanges as seen in FIG. 1.

The caliper housing 24 has a pair of flanges 56 and 58 extending generally circumferentially on one side of the disc, radially outward thereof, and axially outward from the shoe assembly 34. A similar pair of flanges 60 and 62 are provided on the other side of the caliper housing. Each flange has an orifice or opening 64 formed therein which is considerably larger than the mating portion of the bolt assembly extending therethrough, as is better seen in FIG. 3. FIG. 3 shows an enlarged view of part of flange 56. The other flanges are similarly constructed and therefore only flange 56 will be described in greater detail. The flange has a groove 66 formed in its inner wall surface 68. This groove has a base 70 which is not as wide as the groove opening 72 at the wall surface 68. The groove sidewalls 74 and 76 are slanted for this purpose in the manner of a chamfered groove. The bolt or mounting pin assembly 18 has a bolt-mounting section 78 received through opening 64 and somewhat smaller than the opening. The resilient ring 80 is received in groove 66 so teat its inner periphery 82 engages the bolt or pin surface 84, and its outer periphery 86 engages the groove base 70. The ring may be circular in cross section and of such size as to be squeezed between the pin surface 84 and the groove base 70 to the extent that it has a deformed section like that illustrated in FIG. 3. When a circular cross section ring is used, the radial squeeze between the inner and outer ring peripheries may be on the order of 22 percent. Alternatively, the ring may have a generally oval shape so that the minor axis extending between the inner and outer ring peripheries is squeezed somewhat less, on the order of 5 percent, to give substantially the same installed cross section. As the brake shoes wear, the rings will slide, allowing the housing to adopt a new adjusted position.

The bolt assemblies 18 and 20 are similarly constructed, and therefore only assembly 18 will be further described in detail. The bracket 16 has threaded openings 88 through which the bolt assemblies are received. Bolt assembly 18 is provided with a central threaded section 90 which threads into an opening 88. The bolt-mounting section 78 extends from one side of the threaded section 90, and an elastic tension section 94 extends from the other side of the threaded section 90. Section 94 terminates in the bolt head 96. A spacer or sleeve 98 extends over the elastic tension section 94 so that its ends respectively engage the head 96 and the bracket 16. Thus when the bolt is tightened, it has a substantial length through which elastic extension can take place. Therefore any slight relaxation of the bolt torque will result in minimal tension loss in the bolt. Otherwise, with a very short elastic extension bolt length between the bolt head 96 and the threaded section 90, the bolt could become relaxed so that substantially no retaining torque would be exerted thereon after a period of time and could become loose and fall out. While in the particular brake arrangement the loss of one or even all of the bolt assemblies would not render the disc brake assembly inoperative, it would permit the generation of noises. It can be noted that when the brake assembly is installed in combination with the wheel assembly 14, even with the bolt assemblies 18 and 20 removed, the entire caliper housing is caged against movement into an inoperative position. The wheel rim 100 limits radial outward movement of the caliper housing, and the disc 12 limits both axial movement in either direction and radially inward movement. The bracket 16 continues to limit circumferential movement of the housing. Therefore the brake will still operate even though the mounting and guide assemblies 18 and 20 are removed. However, in order to best position the brake shoe assemblies for wear and effectiveness, and to operate the brakes with a minimum amount of noise, it is preferable to guide the caliper by assemblies 18 and 20. It is noted that the caliper housing flange 60 is fitted about the outer surface of the spacer 98 in spaced relation thereto, so that the resilient ring 102 acts in the same manner as does resilient ring 80 with regard to flange 56 and bolt mounting section 78. The cross section area of each resilient ring in relation to its associated groove and pin assembly surface area is such that side loading deformation of the ring will not result in metal-to-metal contact of the bolt assembly and the inner wall surface of the flange, thereby minimizing noise generation. It has been found preferable to cadmium plate the bolt outer surface areas engaging the resilient rings to further minimize binding corrosion. This therefore permits utilization of the maximum available braking force for applying the brakes rather than for overcoming corrosion resistance.

What is claimed is:

1. A mounting arrangement for mounting an axially movable element on an axially fixed element variously subject to side loading, axial loading, and vibrations, said mounting arrangement comprising:
   a fixed support;
   a pair of pin assemblies secured to said fixed support, each of said pin assemblies having
      a threaded center section,
      an elastic extension section on one side of said threaded section terminating in a head,
      an element support section,
      and a compression sleeve extending concentrically about the elastic extension section and engaging said head and said fixed support,
   each pin assembly being threaded into said fixed support under torque to elastically extend said elastic extension section and compress said sleeve;
   said axially movable element having at least two extended support and guide portions for each pin assembly,
      said support and guide sections having axially aligned openings therein receiving each of said pin assemblies on opposite sides of the pin assembly threaded section,
      an internal double-chamfered groove formed in the sidewall of each opening with the sidewall of each opening being radially spaced from the portion of said pin assembly over which it extends,
      a resilient deformable ring received in each groove in radially compressed relation between the adjacent outer surface of the pin assembly and the bottom of the groove and maintaining a radially spaced relationship between the pin assembly and the side wall of the opening at all times,
   said rings sliding on said pin assemblies upon forced axial movement of said element relative to said pin assemblies in one direction to readjust the position of said element on said pin assemblies.

2. A disc brake caliper mounting for a brake having a disc and a caliper housing extending axially and circumferentially over a part of the disc and provided with spaced mounting orifices and a fixed support for the caliper housing, said mounting comprising:
   mounting bolt means spaced circumferentially of the disc and extending axially parallel thereto and fixedly secured to said fixed support and extending through said housing mounting orifices with the radially adjacent walls of said orifices and said bolt means being in spaced relation,
   at least one of the radially adjacent walls of each orifice and bolt means arrangement having internal grooves with slanted sidewalls providing wider groove openings than groove bases,
   annular resilient rings received in said grooves and about said bolt means in friction engaging relation and being compressed between said groove bases and the radially adjacent walls which are spaced from the walls having the grooves therein,
   said rings having deformable cross section areas due to side loading which are sufficient to prevent said bolt means adjacent walls from directly engaging said housing orifice adjacent walls,
   each of said bolt means having
      a head,
      a center threaded mounting section spaced therefrom and threaded into one of the openings in said fixed support,
      and a cylindrical spacer surrounding the bolt portion intermediate the head and the threaded section,
         said spacer having one end engaging said head and the other end engaging said fixed support, said spacer being loaded in axial compression and said intermediate bolt portion being loaded in axial tension.

3. The mounting of claim 2, said spacer providing a caliper-mounting area engaged by at least one of said resilient rings.

4. The mounting of claim 2, each of said bolt means having a bolt section extending beyond said threaded section opposite said head and providing a caliper-mounting area engaged by at least another one of said resilient rings.

* * * * *

PO-1050
(5/69)

UNITED STATES PATENT OFFICE
CERTIFICATE OF CORRECTION

Patent No. __3,628,639__          Dated __December 21, 1971__

Inventor(s) __Frank R. L. Daley, Jr.__

It is certified that error appears in the above-identified patent and that said Letters Patent are hereby corrected as shown below:

Column 2, line 1, the word "position" should read -- piston --.
Column 2, line 14, the word "time" should read -- tie --.
Column 2, line 45, the word "teat" should read -- that --.
Column 4, Claim 3, line 49, the reference to claim 2 should read -- claim 1 --.
Column 4, Claim 4, line 51, the reference to claim 2 should read -- claim 1 --.

Signed and sealed this 20th day of June 1972.

(SEAL)
Attest:

EDWARD M. FLETCHER, JR.
Attesting Officer

ROBERT GOTTSCHALK
Commissioner of Patents